Patented Apr. 7, 1942

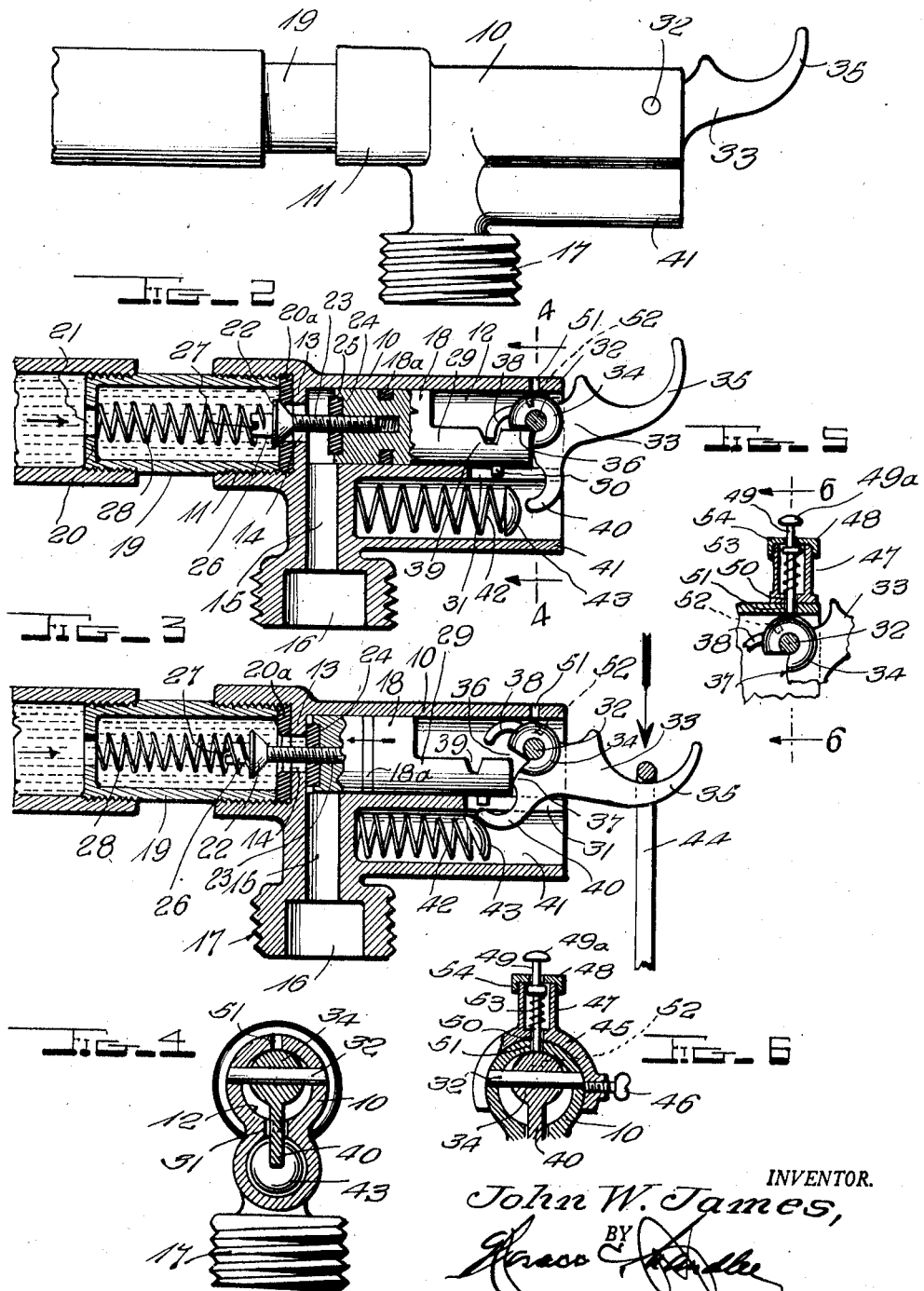

2,278,655

UNITED STATES PATENT OFFICE 2,278,655

AUTOMATIC FAUCET

John W. James, Macon, Ga.

Application May 4, 1940, Serial No. 333,407

8 Claims. (Cl. 249—58)

This invention relates to improvements in faucets.

The principal object of the invention is to provide a faucet adapted to be opened for the delivery of liquid into a receptacle when the latter is hung thereon and which will automatically close when a predetermined weight of liquid has been delivered to the receptacle.

While the invention may be used in connection with liquids of any kind, it will be described herein as used for dispensing water.

Faucets of the type mentioned are particularly adapted for use at filling stations, where it is customary to keep a bucket of water constantly on hand for the purpose of servicing the cars of customers. They are also particularly adapted for use in factories and other places where it is customary to maintain buckets of water for use in case of fire. These buckets are generally out of use for long periods of time during which the water evaporates therefrom, thereby rendering it necessary for additional water to be added from time to time. With the use of the present faucet as a supporting means for such buckets, however, the supply of water is automatically replenished as evaporation takes place.

An object of the invention is to provide a faucet of the type mentioned which may be readily adapted to be opened by the weight of a particular receptacle, and to be closed by the weight of a particular amount of water to be drawn thereinto.

A further object is to provide a faucet of the type mentioned which shall be so constructed as to insure quick and tight closing thereof.

Another object is to provide a faucet of the type mentioned which will be simple of construction, and inexpensive to manufacture.

Other objects and advantages will be apparent during the course of the following description taken in connection with the accompanying drawing in which Fig. 1 illustrates a side elevation of the faucet connected to a water line, Fig. 2 is a vertical longitudinal section of the same, Fig. 3 is a vertical longitudinal section showing the faucet in use and closed by the weight of the water drawn into a receptacle suspended therefrom, Fig. 4 is a section taken on the line 4—4 of Fig. 2, Fig. 5 is a fragmentary view in vertical longitudinal section showing means for locking the faucet in open position, and Fig. 6 is a section taken on the line 6—6 of Fig. 5.

Referring to the drawing, the faucet includes a body portion 10 having, in one of its ends, an interiorly threaded inlet opening 11 in line with which is a cylindrical bore 12 of slightly less diameter, said opening and bore being separated at their inner ends, which are in relatively close proximity, by a dividing wall 13 having a central opening 14 therethrough. Extending downwardly from the inner end of the bore 12 is a discharge passage 15, the lower or outer end of which connects with an outlet opening 16 formed in an exteriorly threaded boss 17 on the underside of the body 10, which boss serves as a hose connection which will be referred to later herein.

Slidably mounted in the bore 12 is a piston 18 provided with a packing ring 18a formed of leather or other suitable material, and threaded into the inlet opening 11 is a tubular valve casing 19 the inner end of which bears against a valve seat 20a positioned on the outer face of the wall 13. At the outer end of the valve casing 19 is an inwardly directed annular flange 20 having a central opening 21 therethrough. Positioned within the valve casing 19 is a conical valve 22 having a threaded stem 23 extending from its inner side, through the valve seat 20a, and through the opening 14 in the wall 13. The free end of the stem 23 is threaded into the center of the inner end of the piston 18 and passes through the center of a valve 24 mounted in a recess 25 in said inner end, the valve 24 being adapted to engage the inner face of the wall 13 at times, thus closing the opening 14.

Formed on the outer side of the valve 22, in alinement with the stem 23, is a lug 26 having a groove 27 in its outer end to receive a screwdriver for adjusting the valve stem 23 in this piston 18. Surrounding the lug 26 is an end of a coil spring 28, the other end of which bears against the flange 20. It will be noted that the length of said spring is slightly less than the distance between the flange 20 and the valve 22 when the latter is in closed position as shown in Fig. 2, the reason for which will be explained later.

Formed on and projecting longitudinally from the outer end of the piston 18 is a semi-cylindrical extension 29 having a lug 30 projecting downwardly from its underside and into a slot 31 through the lower side of the bore 12, thus preventing turning of the piston 18.

Extending across the bore 12, near its outer end, is a pin 32 on which a supporting member 33 is rockably mounted. This member includes a bulbous portion 34 through which the pin 32 passes and projecting forwardly from which is a hook 35 adapted to support the bail of a receptacle. The supporting member 33 is cut away at 36, resulting in a shoulder 37 adapted to bear against the outer end of the extension 29 of the piston 18 so as to force said piston inwardly of the bore 12 when the supporting member 33 is rocked downwardly. Extending rearwardly from the supporting member is a finger 38 the free end of which is adapted to enter a groove 39 in the upper face of the extension 29 when the supporting member is rocked upwardly, and extending downwardly from said supporting member is a finger 40. Formed in the body portion 10, directly beneath the bore 12 and parallel therewith, is a bore 41 which houses a coil spring 42 having a hemispherical head 43 attached to its outer end.

The operation of the device is as follows:

The receptacle into which water is to be drawn is hung on the hook 35, the weight of which receptacle causes the supporting member 33 to rock on the pin 32. During this rocking movement the shoulder 37 of the supporting member bears upon the outer end of the extension 29, causing the piston 18 to move inwardly, thus overcoming the resistance of the pressure of the water on the valve 22 and opening said valve until it bears against and begins to compress the spring 28. Because of the tension of this spring, the weight of the receptacle will not rock the supporting member 33 sufficiently to move the piston 18 to such a degree as to close the opening 14. Therefore, water will then flow through the valve casing 19, through the opening 14, through the passage 15, and out through the outlet opening 16 into the receptacle. The gradually increasing weight of the water in the receptacle will cause a further rocking of the supporting member 33, thus continuing the inward movement of the piston 18. At the same time the finger 40 will engage the head 43 of the spring 42 and will gradually compress that spring. During the compression of said spring the finger 40 will move over the surface of the rounded head 43 until it reaches a point adjacent its edge which will cause the said head to tilt suddenly into the position shown in Fig. 3, thus causing the supporting member 33 to snap downwardly which will effect a rapid final movement of the piston 18, thus quickly closing the opening 14 through the medium of the valve 24 to shut off the water. When the receptacle is removed from the hook 35 the action of the spring 28, together with the water pressure on the valve 22, will force the piston 18 outwardly until the valve 22 becomes firmly positioned against the valve seat 20, thus closing the opening 14 and raising the hook 35, which operation will be assisted by the action of the spring 42 upon the finger 40. The parts will then occupy the position shown in Fig. 2, and the pressure of the water against the valve 22 will cause the latter to be held firmly against the seat 20, thus preventing leakage while the device is out of use. While the hook 35 is being raised, the finger 38 will enter the groove 39 and the velocity of the upward movement of said hook will cause the said finger to draw the piston 18 rapidly forward, thus assisting the water pressure and spring 28 in seating the valve 22.

In Figs. 5 and 6 there is illustrated an attachment to be used when it is desired to lock the faucet in open position, as when a section of hose is to be attached to the boss 17. This attachment includes a clamp 45 having its interior so shaped as to fit snugly the body portion 10 adjacent the outer end of the bore 12. The clamp 45 is provided with a set screw 46 for holding it securely in this position. Formed on the clamp 45 is a hollow projection 47 provided with a centrally perforated screw cap 48, and mounted for vertical movement within this projection is a latch pin 49, the upper end of which passes through the perforation in the cap 48 and is provided with a terminal thumbpiece 49a. The lower end of the latch pin passes through alining perforations 50 and 51, respectively, in the clamp 45 and the wall of the bore 12 and rests upon the supporting member 33 in which is a recess 52 adapted to receive the lower end of said latch pin. Surrounding said pin is a coil spring 53, the upper end of which bears against the lower side of a collar 54 on said pin and the lower end of which rests on the bottom of the hollow in the projection 47. Thus, said spring tends to urge the latch pin upwardly. When it is desired to lock the faucet in open position, the procedure is as follows: With the thumb of the operator exerting downward pressure on the thumbpiece 49, the hook 35 is forced downwardly with the hand until the recess 52 is directly beneath the perforation 51, whereupon the pin 49 will enter said recess and hold the hook against upward movement. To close the faucet, it is necessary only to press the hook 35 downwardly to a slight degree which releases the latch pin 49 from the recess 52 and permits the hook 35 to rise to the position shown in Fig. 1, thus permitting the valve 22 to close the opening in the valve seat 20a, which will shut off the water.

It will be understood that the principal function of the spring 28 is to counteract the weight of the receptacle suspended from the hook 35, and that its tension will be governed by the weight of such receptacle, also that the tension of the spring 42 will be governed by the weight of the receptacle and that of the water to be drawn thereinto.

What is claimed is:

1. A faucet comprising a body having an inlet passage, a bore in line with said passage, a wall between the passage and bore, said wall having an opening therethrough whereby to afford communication between the passage and bore, a piston reciprocably mounted in the bore, valves disposed at opposite sides of the wall, said valves being connected to the piston and being adapted alternately to close said opening, a depressible supporting member engaging and adapted when depressed to move the piston towards the inlet passage, spring operated means carried by the body for retarding depression of the supporting member at times and for raising it at times, and a discharge passage leading from the bore.

2. A faucet comprising a body, an inlet passage formed in the body, a bore in line with said passage, a wall between the passage and bore and having an opening therethrough, a piston reciprocably mounted in the bore and having a depression in its upper face, valves disposed at opposite sides of the wall, said valves being connected to the piston and being adapted alternately to close said opening, a depressible supporting member engaging and adapted when depressed to move the piston inwardly, a finger carried by the supporting member adapted to engage within the depression of the piston whereby to draw the piston outwardly when the supporting member is raised, spring operated means carried by the body for retarding depression of the supporting member at times and for raising it at times, and a discharge passage leading from the bore.

3. A faucet comprising a body, an inlet passage formed in the body, a bore in line with the said passage, a wall between the passage and bore and having an opening therethrough, a piston reciprocably mounted in the bore, valves at opposite sides of the wall, said valves being carried by the piston and being adapted upon reciprocation of the piston alternately to engage the opposite sides of the wall for closing the opening therethrough, a depressible supporting member adapted when depressed to move the piston inwardly, spring operated means carried by the body adapted to be engaged by the supporting member for retarding depression of the supporting member at times and for raising it at times, and a discharge passage leading from the bore.

4. A faucet comprising a body, an inlet passage formed in the body, a bore in line with the said passage, a wall between the passage and bore and having an opening therethrough, a piston reciprocably mounted in the bore, valves carried by the piston and adapted upon reciprocation thereof alternately to close the wall opening, a depressible supporting member adapted when depressed to move the piston inwardly, a finger depending from said supporting member, a coil spring carried by the body, a rounded head carried by the spring and adapted to engage the finger for urging the supporting member upwardly at times and for retarding depression thereof at times, and a discharge passage leading from the bore.

5. A faucet comprising a body, an inlet passage formed in the body, a bore in line with said passage, a wall between the passage and bore and having an opening therethrough, a piston reciprocably mounted in the bore and having a depression in its upper face, valves disposed at opposite sides of the wall for closing the opening therein, said valves being connected to the piston, a depressible supporting member pivotally mounted in the bore, said member engaging and adapted when depressed to move the piston inwardly, means carried by the supporting member adapted to engage within the depression of the piston whereby to draw the piston outwardly when the supporting member is raised, spring operated means carried by the body adapted to be engaged by the supporting member for retarding depression of the supporting member at times and for raising it at times, and a discharge passage leading from the bore.

6. A faucet comprising a body, an inlet passage in the body, a bore adjacent the inlet passage, a wall between the passage and bore having an opening therethrough, a valve casing supported in the inlet passage, a piston reciprocably mounted in the bore, a depressible supporting member pivotally mounted on the body and adapted to engage the piston and move the same inwardly, valves carried by the piston and adapted alternately to close the wall opening, one of said valves having a head extending into the valve casing, a spring within the valve casing adapted to engage said valve head to retard inward movement of the piston, a discharge passage leading from the bore, and spring operated means carried by the body adapted to be engaged by the supporting member for retarding depression of the supporting member at times and for raising it at times.

7. A faucet comprising a body, an inlet passage in said body, a bore adjacent the inlet passage, a wall between the passage and bore and having an opening therethrough, a piston reciprocably mounted in the bore, valves at opposite sides of the wall and connected to the piston, said valves being adapted alternately to close the wall opening, a depressible supporting member adapted to engage the piston and move the same inwardly, a second bore beneath the first-named bore, a coil spring in the second-named bore adapted to retard depression of the supporting member at times and to raise it at times, said spring having a rounded head adapted to be engaged by the supporting member.

8. A faucet comprising a body, an inlet passage formed in the body, a bore in line with said passage, a wall between the passage and bore and having an opening therethrough, a piston reciprocably mounted in the bore and having a depression in its upper face, valves disposed at opposite sides of the wall for closing the opening therein, said valves being connected to the piston, a depressible supporting member engaging and adapted when depressed to move the piston inwardly, means carried by the supporting member adapted to engage within the depression of the piston whereby to draw the piston outwardly when the supporting member is raised, a second bore in the body portion beneath the first-mentioned bore, a coil spring mounted in the second-named bore, a rounded head on said spring, and a finger depending from the depressible member and adapted to engage said rounded head when said member is depressed, whereby to compress said spring and tilt said head.

JOHN W. JAMES.